(12) United States Patent
Pantazi et al.

(10) Patent No.: US 10,650,307 B2
(45) Date of Patent: May 12, 2020

(54) NEUROMORPHIC ARCHITECTURE FOR UNSUPERVISED PATTERN DETECTION AND FEATURE LEARNING

(71) Applicant: International Business Machines Corporation, Armonk, NY (US)

(72) Inventors: Angeliki Pantazi, Thalwil (CH); Stanislaw Andrzej Wozniak, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 15/264,081

(22) Filed: Sep. 13, 2016

(65) Prior Publication Data

US 2018/0075346 A1    Mar. 15, 2018

(51) Int. Cl.
| | | |
|---|---|---|
| *G06N 3/08* | (2006.01) | |
| *G06N 3/04* | (2006.01) | |
| *G06N 3/02* | (2006.01) | |
| *G06Q 30/00* | (2012.01) | |
| *G06Q 20/40* | (2012.01) | |
| *G06N 3/063* | (2006.01) | |

(52) U.S. Cl.
CPC .............. *G06N 3/049* (2013.01); *G06N 3/063* (2013.01); *G06N 3/088* (2013.01); *G06N 3/0454* (2013.01)

(58) Field of Classification Search
CPC ........ G06N 3/049; G06N 3/063; G06N 3/088; G06N 3/0454
USPC ...................................................... 706/1-62
See application file for complete search history.

(56) References Cited

U.S. PATENT DOCUMENTS

| | | | | |
|---|---|---|---|---|
| 8,600,830 | B2 * | 12/2013 | Hoffberg | ............ G06Q 30/0207 705/26.3 |
| 9,015,092 | B2 * | 4/2015 | Sinyavskiy | ............ G06N 20/00 706/25 |
| 9,146,546 | B2 | 9/2015 | Sinyayskiy et al. | |
| 9,195,903 | B2 | 11/2015 | Andreopoulos et al. | |

(Continued)

FOREIGN PATENT DOCUMENTS

CN     102906767 A     1/2013

OTHER PUBLICATIONS

Andrew Nere, Umberto Olcese, David Balduzzi, Giulio Tononi "A Neuromorphic Architecture for Object Recognition and Motion Anticipation Using Burst-STDP" May 15, 2012 http://dx.doi.org/10.1371/journal.pone.0036958.

(Continued)

*Primary Examiner* — Brandon S Cole
(74) *Attorney, Agent, or Firm* — Harrington & Smith

(57) ABSTRACT

Embodiments relate to a neuromorphic architecture for unsupervised feature learning using memristive synapses realized using phase-change devices. A spiking neural network architecture for unsupervised pattern learning and a spike-based learning algorithm compatible with phase-change synapses is described, and a feature-learning algorithm capable of performing a sequence of set operations on input patterns is provided. A learning rule for the extraction of certain features of the input that is compatible with spiking neurons and synapses with spike-based plasticity is also provided. The system enables enhanced pattern- and feature-extraction capabilities in neuromorphic systems.

20 Claims, 9 Drawing Sheets

(56) References Cited

U.S. PATENT DOCUMENTS

| | | | |
|---|---|---|---|
| 9,269,044 B2 | 2/2016 | Akopyan et al. | |
| 2005/0240412 A1* | 10/2005 | Fujita | G10L 15/16 704/270 |
| 2013/0073493 A1 | 3/2013 | Modha | |
| 2013/0297542 A1* | 11/2013 | Piekniewski | G06N 3/04 706/27 |
| 2013/0325775 A1* | 12/2013 | Sinyavskiy | G06N 20/00 706/25 |
| 2014/0025613 A1* | 1/2014 | Ponulak | G06N 3/08 706/25 |
| 2014/0032459 A1* | 1/2014 | Sinyavskiy | G05B 13/025 706/16 |
| 2014/0143193 A1* | 5/2014 | Zheng | G06N 3/049 706/25 |
| 2015/0094850 A1* | 4/2015 | Passot | B25J 9/163 700/245 |
| 2015/0302296 A1 | 10/2015 | Thibeault et al. | |
| 2016/0267379 A1* | 9/2016 | Eleftheriou | G11C 11/5678 |

OTHER PUBLICATIONS

Giacomo Indiveri, Federico Corradi, and Ning Qiao "Neuromorphic Architectures for Spiking Deep Neural Networks" Institute of Neuroinformatics, University of Zurich and ETH Zurich, Zurich Switzerland.

* cited by examiner

NEUROMORPHIC ARCHITECTURE FOR UNSUPERVISED PATTERN DETECTION AND FEATURE LEARNING

BACKGROUND

The present invention is in the technical field of architectures for computational devices. More specifically, the present invention is in the field of pattern detection and feature learning.

This section is intended to provide a background or context to the invention disclosed below.

The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Neuromorphic systems provide a biologically inspired method of computing as an alternative to the classical von Neumann approach. The classical von Neumann architecture is increasingly being challenged by the throughput limitations between the physically separated memory and the CPU. Other challenges arise from the exponential growth of large streams of unstructured data, as von Neumann machines are often inefficient in terms of power or area or are too slow for a large class of parallel workloads.

Neuromorphic computing explores biologically inspired, energy-, power density-, and area-efficient hardware architectures capable of learning and of carrying out event-based computations. In neuromorphic systems, computation is performed by a network of spiking neurons controlled by the values of their synaptic weights, which are obtained in the process of learning. In contrast to the classical von Neumann architecture, a neuromorphic system implementing a spiking neural network (SNN) is inherently parallel: neurons perform operations asynchronously, and synapses receive operands from a network of synaptic interconnections. Furthermore, owing to developments in the field of nanomaterials, further benefits in area efficiency and power dissipation can be gained by using memristive devices for the neurosynaptic realization. Specifically, neurons and synapses can be implemented using memristive circuit elements in which the device conductance represents the membrane potential and the synaptic weight. Synaptic learning occurs based on the currents flowing through the devices.

Providing efficient synaptic learning rules is a challenging task. From the implementation aspect, these rules should primarily use local information, as in spike-timing dependent plasticity (STDP), but simultaneously develop a knowledge representation that is useful in the global context. For example, in the case of multi-layer artificial neural networks, feature-based representations develop, in which neurons become sensitive to certain informative characteristics of the input, and enable increasingly abstract processing to occur in the consecutive layers.

The values of the synaptic weights represent the knowledge of a network, which determines its performance on a particular task. Numerous approaches exist for learning neural networks, but the lowest error rates are obtained in deep learning, where an artificial neural network (ANN) learns a hierarchy of features, e.g., certain useful characteristics of an input. Feature learning is an approach to learning neural networks, in which extracting informative properties of the input is preferred to memorizing all possible input patterns. These properties, called features, are then utilized by multi-layered architectures to improve the accuracies on difficult tasks. In contrast, SNNs are more suitable for efficient event-based hardware realizations. The knowledge from an ANN can be translated into an SNN by porting the weights. However, it would be beneficial to develop an architecture that learns certain features directly in a spiking network.

Neural networks are also important in achieving unsupervised and self-organizing sub-systems. Large scale lateral inhibition can give rise to competitive or "winner-take-all" behavior within an area defined by the range of the inhibition. When excitatory connections are also used, topographic or computational mapping can be established. This is because if a particular node responds to a given input, nearby nodes may also partly respond. There is extensive evidence from neuroscience as to the importance of topographic mappings and indeed it is regarded as being a building block in the infrastructure of information processing in the nervous system.

BRIEF SUMMARY

This summary is provided with the understanding that it will not be used to limit the scope or meaning of the claims.

According to an embodiment, an apparatus for computation is provided comprising: a first neuronal module comprising a first plurality of neurons, wherein each neuron in the first plurality of neurons operates with a different learning mechanism selected from a first set of learning mechanisms; a second neuronal module comprising a second plurality of neurons, wherein each neuron in the second plurality of neurons operates with a different learning mechanism selected from a second set of learning mechanisms; and an arbitration mechanism operatively connected to the first neuronal module and the second neuronal module.

According to another embodiment, a method is provided for pattern detection and feature learning, the method comprising: training a first neuronal module, wherein the first neuronal module comprises a first neuron having a first learning mechanism; training a second neuronal module, wherein the second neuronal module comprises a second neuron having a second learning mechanism; providing an arbitration mechanism connected to the first neuronal module and the second neuronal module; and applying an input to the first neuronal module and the second neuronal module.

According to another embodiment, an apparatus for computation is provided, the apparatus comprising: a first neuronal module comprising a first level tuned neuron, wherein the first level tuned neuron has a first learning mechanism; a second neuronal module comprising a second level tuned neuron, wherein the second level tuned neuron has a second learning mechanism; and an arbitration mechanism operatively connected to the first neuronal module and the second neuronal module and comprising a third neuron that provides a level output that modifies the behavior of the first neuronal module and second neuronal module.

These and other features, aspects, and advantages of the present invention will become readily apparent to those skilled in the art and understood with reference to the following description, appended claims, and accompanying figures, the invention not being limited to any particular disclosed embodiment(s).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

Other features of the present embodiments will be apparent from the Detailed Description that follows.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical and structural changes may be made to the embodiments without departing from the spirit and scope of the present teachings. The following detailed description is therefore not to be taken in a limiting sense, and the scope of the present disclosure is defined by the appended claims and their equivalents.

Figure 1:
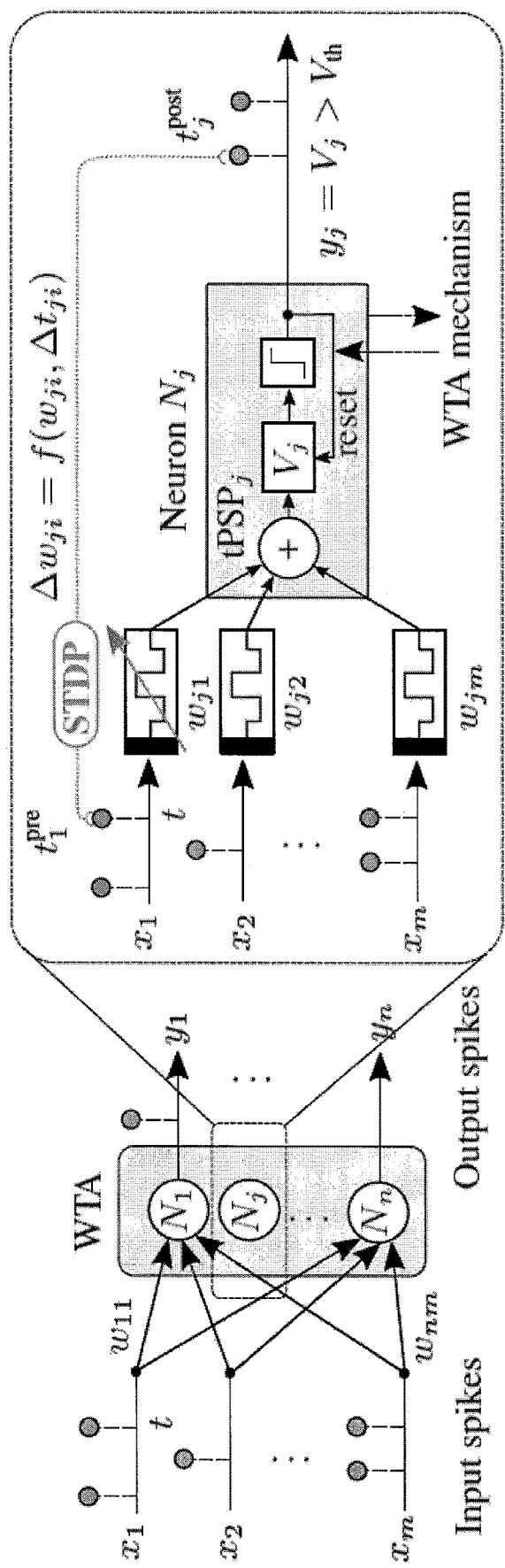
FIG. 1 illustrates a spiking neural network architecture for unsupervised pattern learning, according to an embodiment of the present invention.

FIG. 1 illustrates a spiking neural network architecture for unsupervised pattern learning, according to an embodiment of the present invention. Correlated groups of spikes appearing at the input represent co-occurrence of particular events, and form spatio-temporal patterns to be learned by the system. The remaining uncorrelated events are considered as noise and should not be captured. The present invention, in an embodiment, is able to extend the learning mechanism to discriminate between several different correlated groups.

We consider a spiking neural network presented in FIG. 1 that comprises n neurons of IF (Integrate-and-Fire) type with m synapses. The network receives spikes $x_i$ arriving at the synaptic inputs i=1 ... m. A neuron $N_j$, j=1 ... n, sums the inputs modulated by the synaptic weights $w_{ji}$ to obtain the total post-synaptic potential $$tPSP_j = \sum_{i=1}^{m} w_{ij} x_i,$$

and then integrates it into the neuronal membrane potential $V_j$. When the membrane potential crosses a threshold $V_{th}$, a post-synaptic spike is emitted and the membrane potential is reset to 0. Post-synaptic spikes typically appear when the input matches the pattern stored in the synaptic weights. The tPSP signal reflects the strength of the synapses, which are activated by the input at each time instance. Therefore, when the incoming spikes correspond to the highly potentiated synapses, high tPSP values lead to a fast crossing of $V_{th}$ and emission of output spikes.

Figure 2:
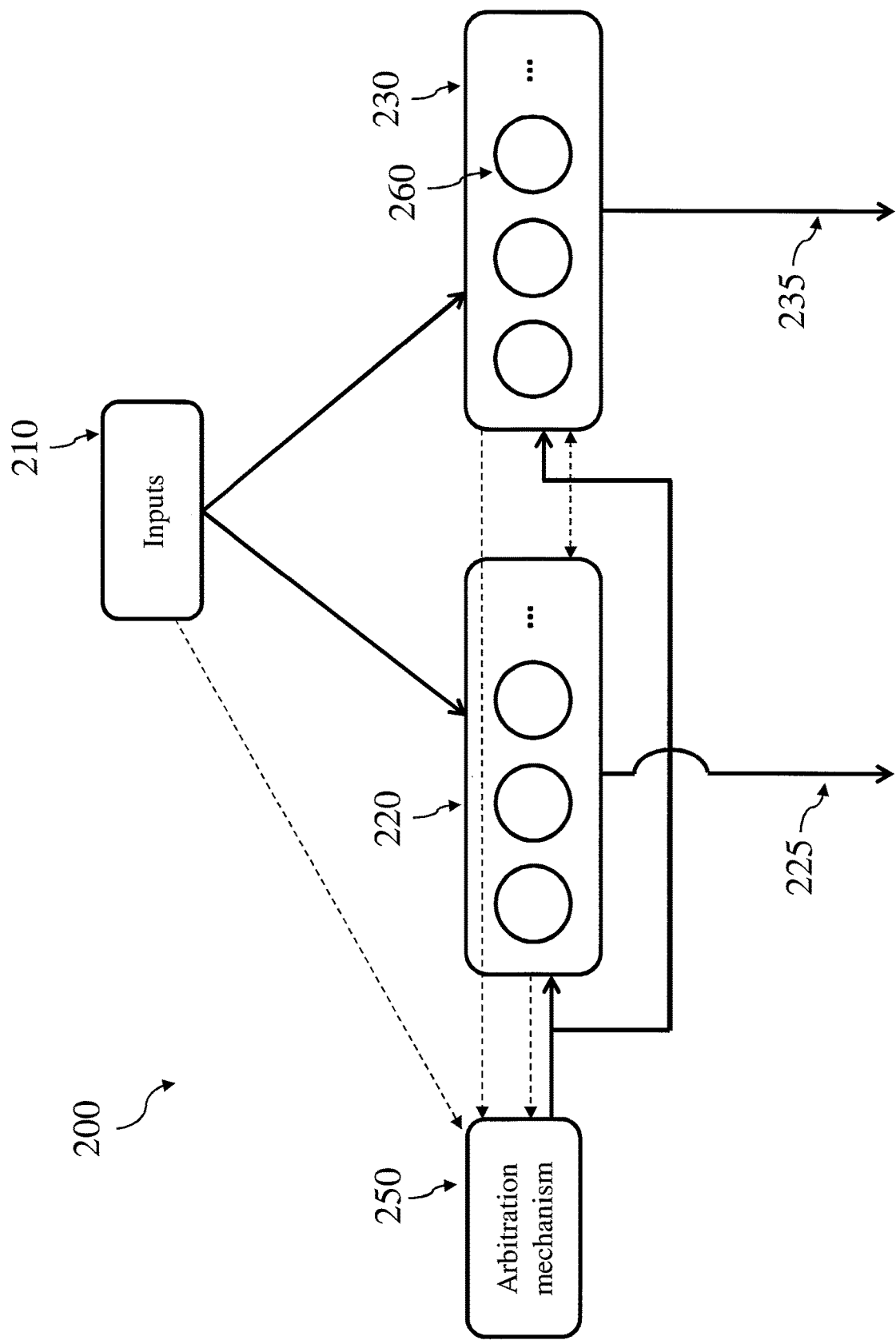
FIG. 2 illustrates an architecture comprising several neuronal modules for unsupervised pattern detection and feature learning using a collection of enhanced learning rules, according to an embodiment of the present invention.

FIG. 2 illustrates the architecture comprising several neuronal modules for unsupervised pattern detection and feature learning using a collection of enhanced learning rules, according to an embodiment of the present invention. A set of inputs 210 are fed into a first neuronal module 220 and a second neuronal module 230. The set of inputs 210 can also be fed into the arbitration mechanism 250 in some embodiments, such as those with level tuning, as shown by the dotted line. The second neuronal module 230 contains at least one neuron 260. The set of neurons in a neuronal module are for different tasks with different learning mechanisms. Likewise, the first neuronal module 220 contains a set of neurons for different tasks with different learning mechanisms. The arbitration mechanism 250 makes the first neuronal module 220 and the second neuronal module 230 selective to a specific input pattern through an arbitration mechanism. This arbitration mechanism 250 comprises, in an embodiment, a primary neuron with links for inter-neuronal feedback to neurons in the neuronal modules, called level-tuned neurons in this embodiment. In an alternative embodiment, the arbitration mechanism 250 comprises inhibitory connections between the first neuronal module 220 and the second neuronal module 230. In this case where inhibition is used, the arbitration mechanism 250 receives information from the modules 220, 230. Although only two neuronal modules are shown in FIG. 2, embodiments comprising more neuronal modules are considered. In some embodiments the modules can exchange information, as shown by the dotted line between the two modules 220, 230. For example, different learning rules for particular neurons within a module may use information about whether another module is spiking.

Figure 3:
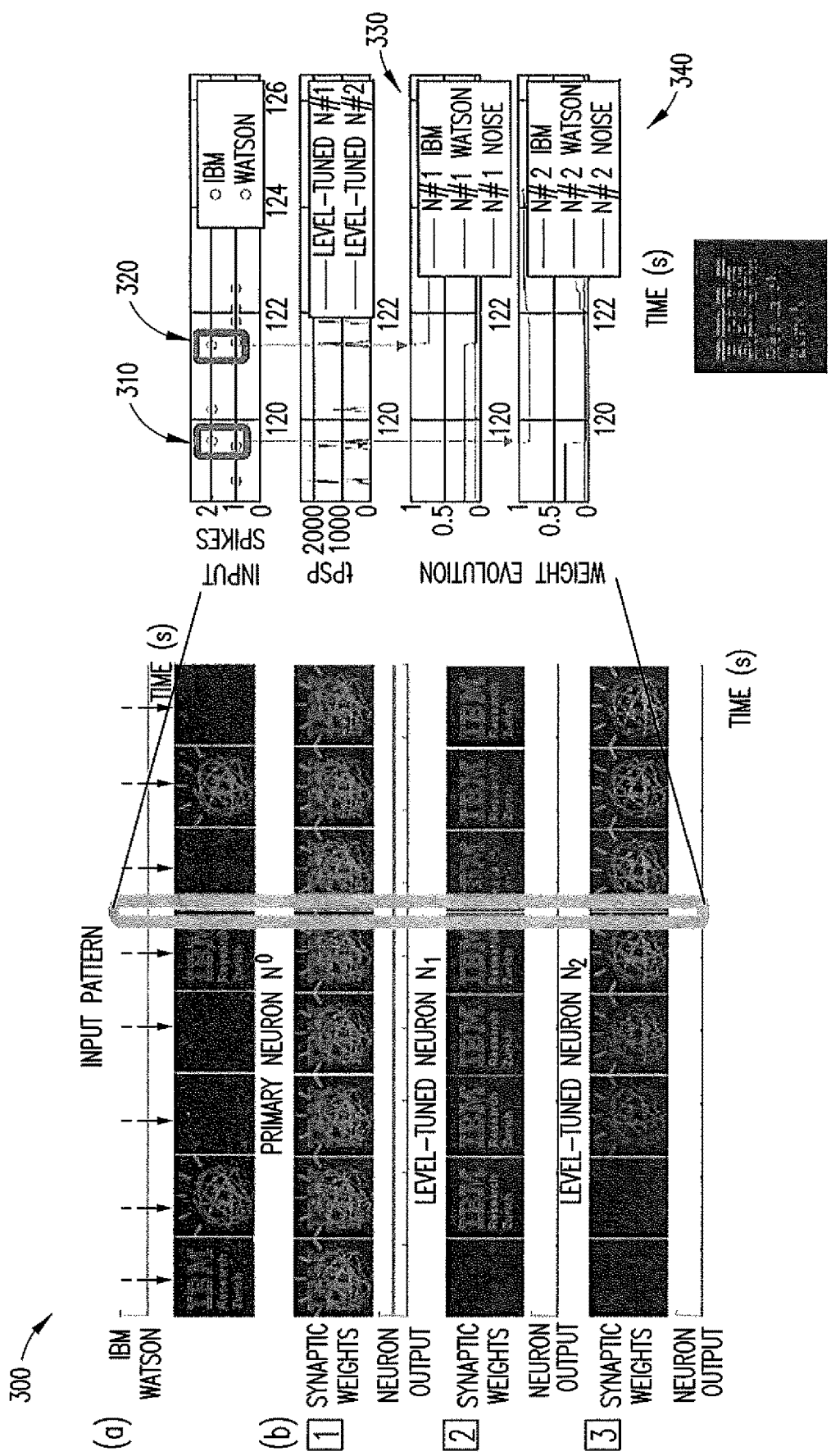
FIG. 3 illustrates pattern detection, according to an embodiment of the present invention.

FIG. 3 illustrates pattern detection, according to an embodiment of the present invention. This figure presents the issues occurring in pattern learning with asymmetric STDP and level-tuning. The asymmetric STDP is a formulation that is compatible phase-change synapses where the depression is abrupt. In this case, the appearance of overlapping patterns close to each other in time results in a depression (removal) of the common part of the patterns. This is observed as a drop of weights in the first neuron weight evolution plot 330 and the second neuron weight evolution plot 340. In the first neuron weight evolution plot 330, the nearly simultaneous appearance 320 of both patterns causes the weights to drop for the first neuron. Likewise, in the second neuron weight evolution plot 340, the nearly simultaneous appearance 310 of both patterns causes the weights to drop for the second neuron. In these cases, where both patterns arrive at close time instances, the common pixels may be depressed because of the simplified STDP mechanism. Although the system quickly recovers without affecting the performance of the detection mechanism, the solution to this problem will make the detector more robust especially if more patterns are present in the input.

Figure 4:
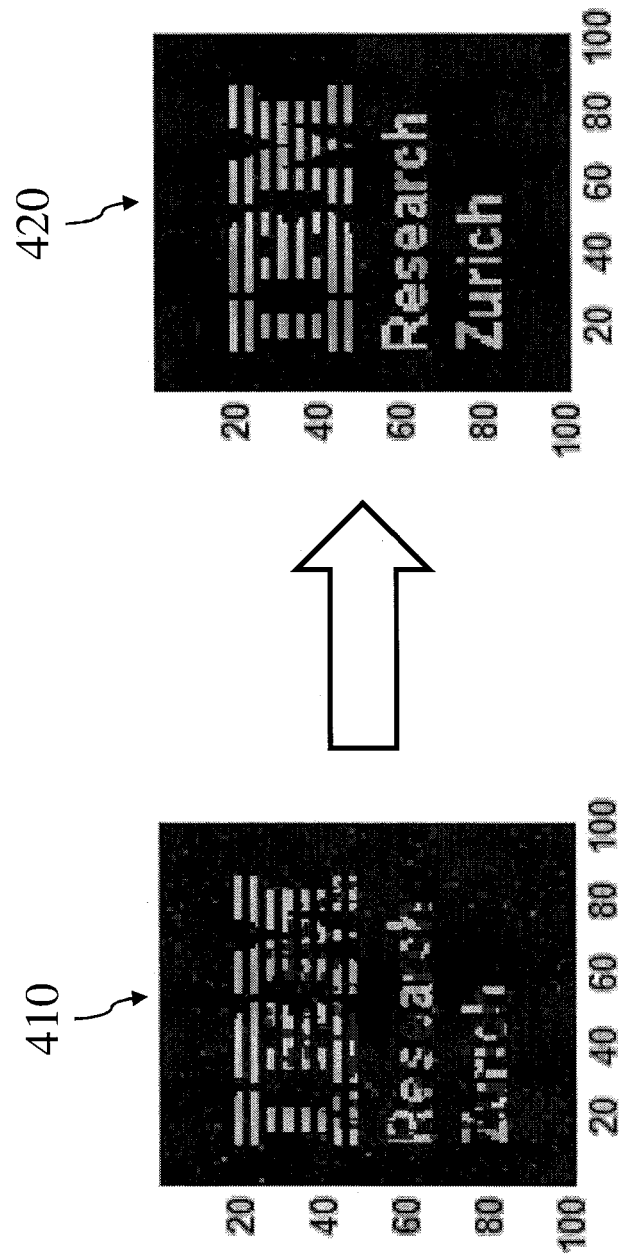
FIG. 4 illustrates the pattern being maintained in the synaptic weights, according to an embodiment of the present invention.

FIG. 4 illustrates the pattern being maintained in the synaptic weights, according to an embodiment of the present invention. Here, one can see that the pattern 410 on the left has many "missing" pixels. That is, the image has been depressed in a way that corrupted the image. By applying selective depression, the problem in FIG. 3 is avoided and the system learns the full pattern 420. Enhanced pattern detection, which is enabled by an embodiment of the present invention, prevents the missing pixels from occurring.

Figure 5:
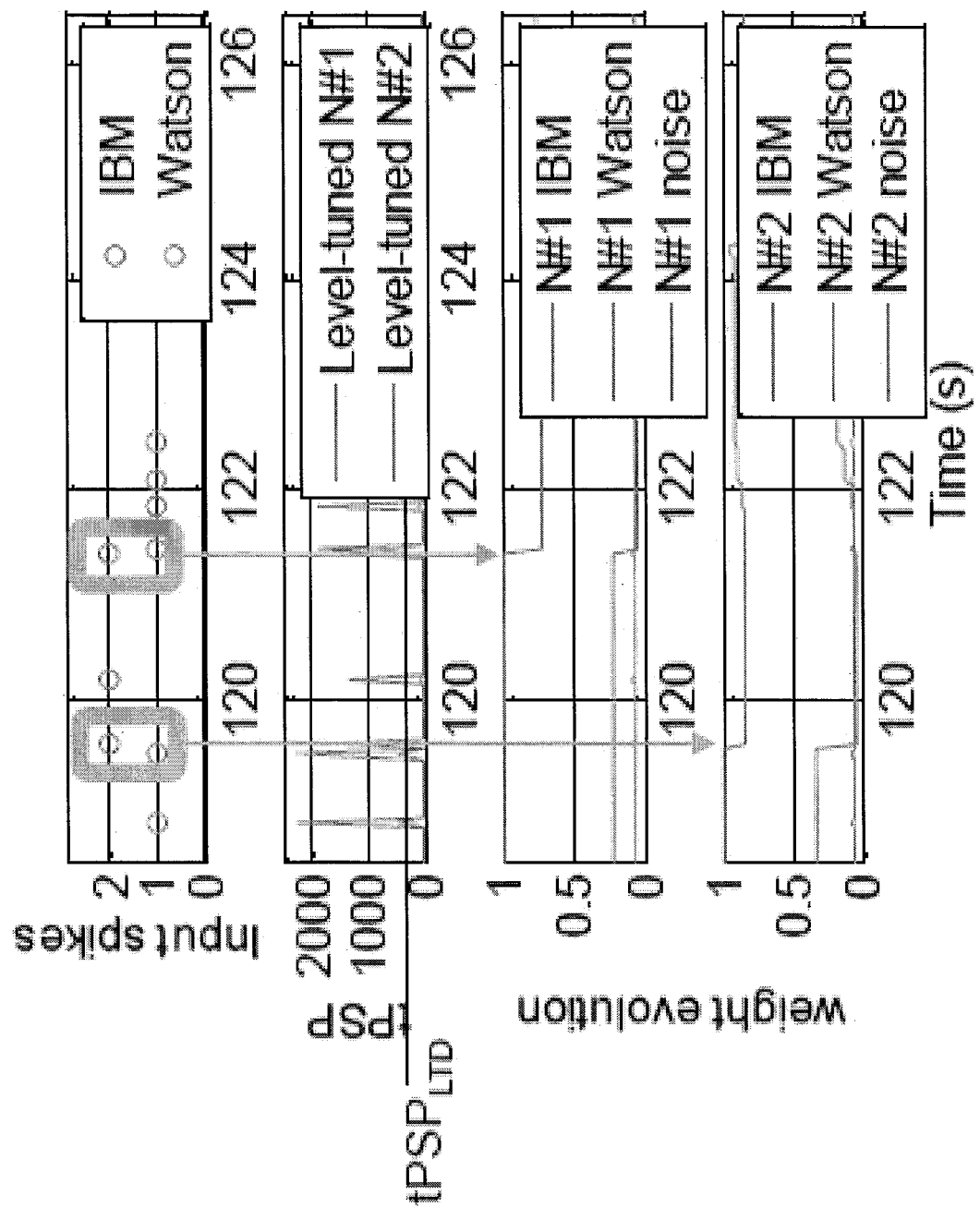
FIG. 5 illustrates a simulation result of an embodiment of the present invention showing common feature learning.

FIG. 5 illustrates a simulation result of an embodiment of the present invention showing common feature learning. The learning rule for common feature learning can be as follows. The general learning formula is, $$\Delta w = \begin{cases} f_+(w, \Delta t) & \text{if } \Delta t \geq 0 \\ f_-(w, \Delta t) & \text{if } \Delta t < 0 \text{ and } tPSP < tPSP_{LTD} \\ f^* & f\Delta t < 0 \text{ and } tPSP \geq tPSP_{LTD} \end{cases}$$

Figure 6:
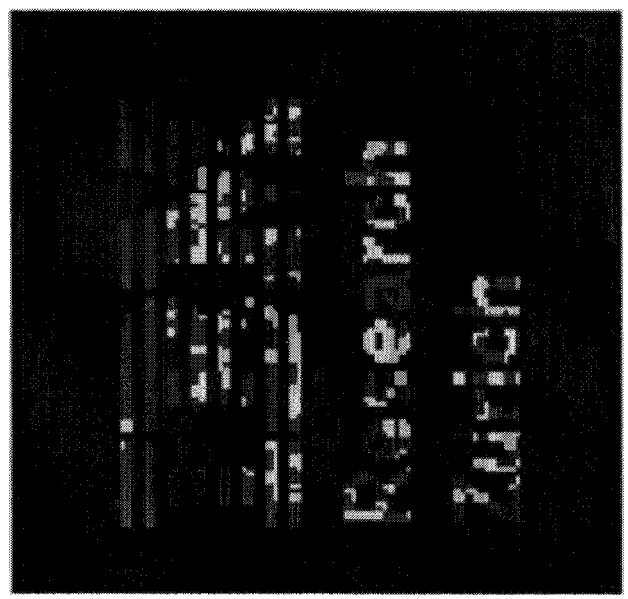
FIG. 6 illustrates common features extracted by the system, according to an embodiment of the present invention.

In this formula, STDP is combined with two depression mechanisms, selectable based on the cumulative strength of the activated input synapses. The function $f^*$ is a mechanism introduced in the case when selective depression would disable the LTD. An inverted learning mechanism, $\forall_{i \notin inputSpiked} \Delta w_i = f_-(w_i, \Delta t_i)$, is then applied. By inverted, it is meant that the mechanism is applied to a complement of inputs. As a result, the regular mechanism of learning may increase/decrease the weights that would be decreased/increased in a case without the inverted operation. By application of these learning rules, the system depresses the remaining pixels instead of depressing the common part. FIG. 5 shows when depression of common part occurs. At these time instances, the $f^*$ mechanism is triggered to learn the common feature. FIG. 6 illustrates common features extracted by the system, according to an embodiment of the present invention.

Figure 7:
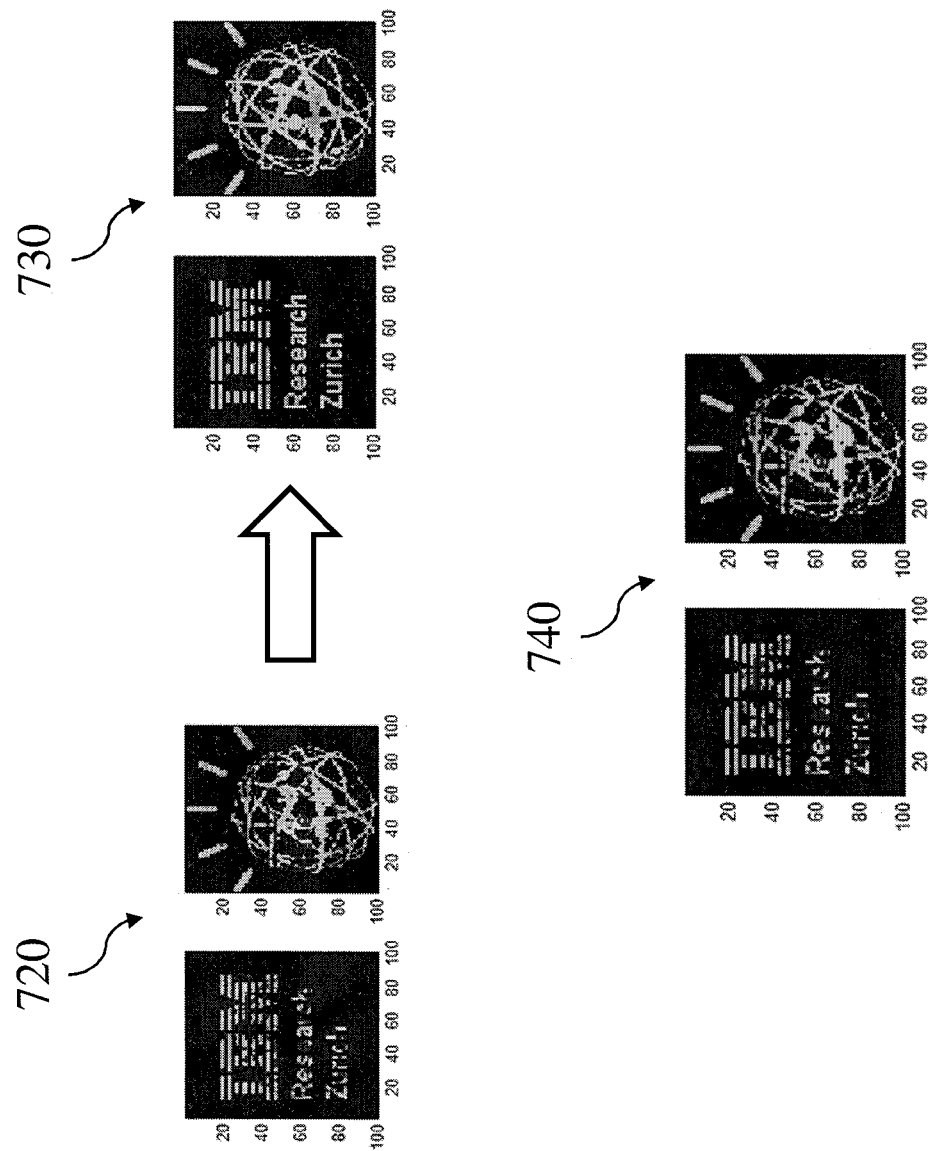
FIG. 7 illustrates a simulation result of an embodiment of the present invention showing feature learning by using the enhanced learning rules.

FIG. 7 illustrates a simulation result of an embodiment of the present invention showing feature learning by using the enhanced learning rules. The "unwanted" depression of the common part of the patterns leads to extraction of unique features of these patterns 720. With a classic STDP rule, depressed parts of the patterns 720 are a transient state and will be potentiated back to the entire patterns 730. In an embodiment, a mechanism of selective potentiation is introduced, in which after a neuron has learned a particular feature, the potentiation is disabled so that the features remain stable, as seen in the lower plots 740. Selective potentiation can disable learning based on various criteria, including, but not limited to, tPSP greater than tPSP_learned, or a large enough number of synapses having reached a high value.

Figure 8:
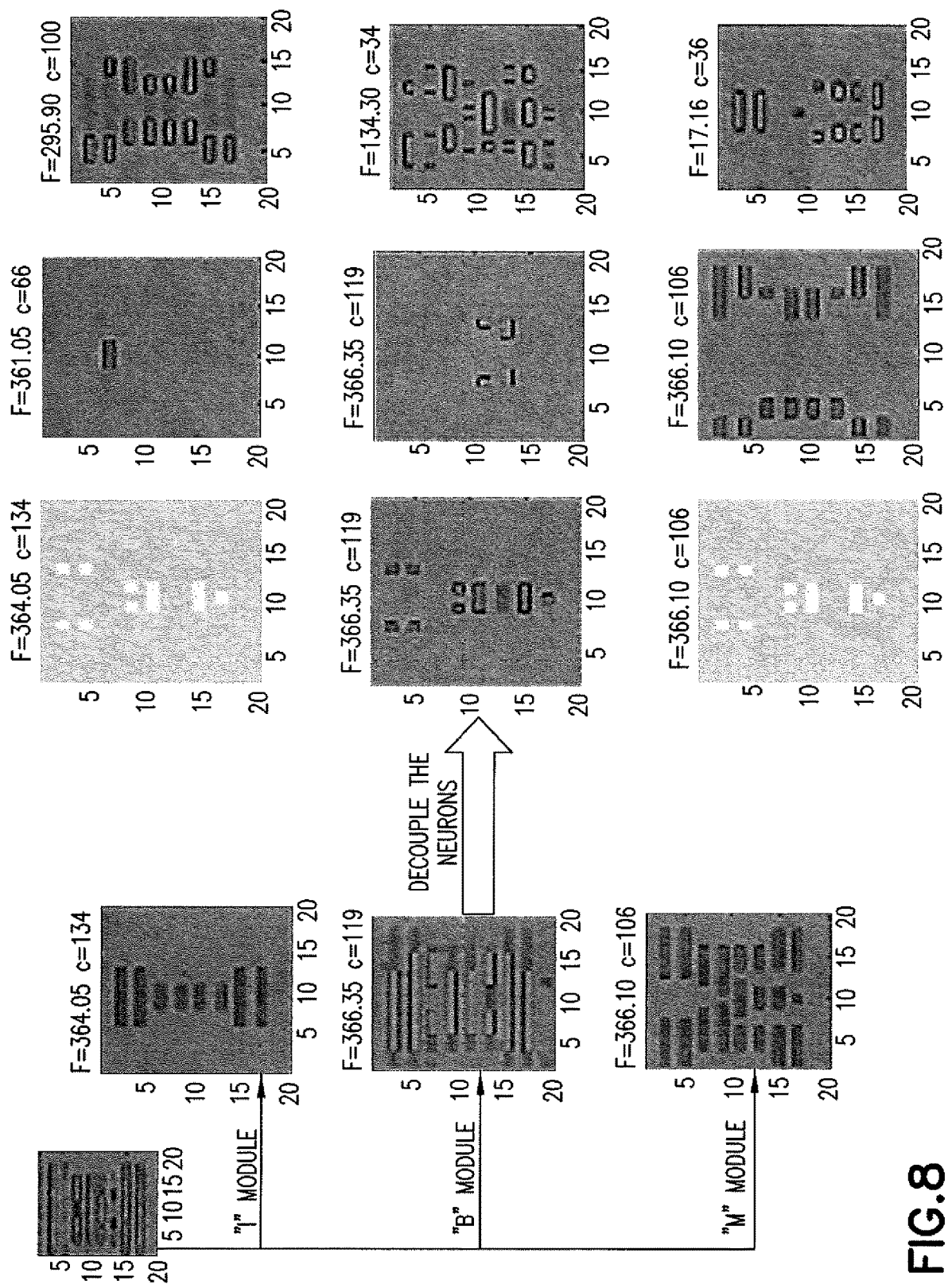
FIG. 8 illustrates an embodiment of the present invention for use in a multilayer architecture.

FIG. 8 illustrates an embodiment of the present invention for use in a multilayer architecture. After the learning stage, neurons may be decoupled from the neuronal modules and used separately as needed. Note that in this case the learning should be disabled, as the learning mechanisms assume that neurons are operating within neuronal modules.

Figure 9:
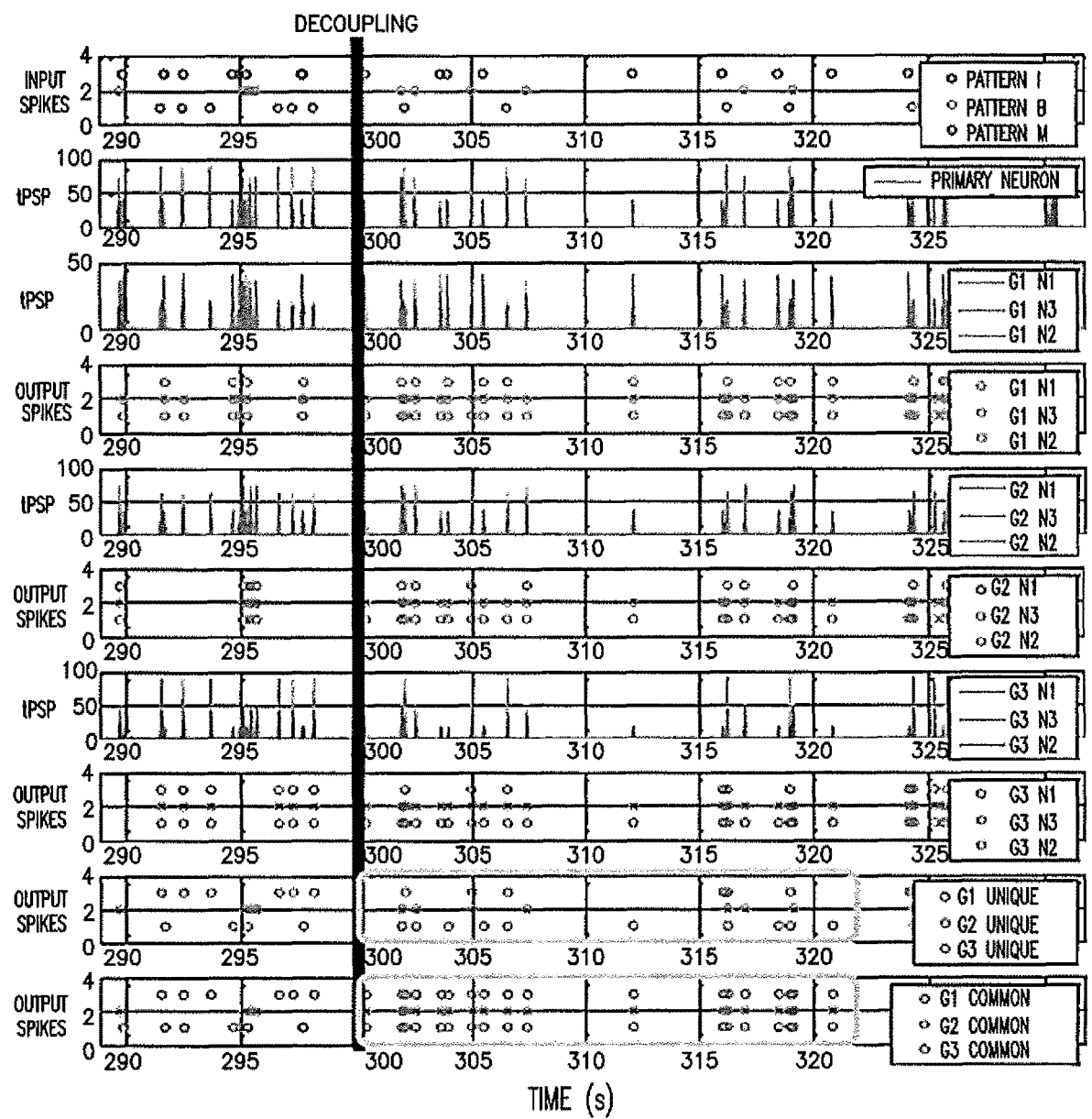
FIG. 9 illustrates a neuron spike when a pattern or feature is detected, according to an embodiment of the present invention.

FIG. 9 illustrates a neuron spike when a pattern or feature is detected, according to an embodiment of the present invention. In this plot, neurons spike when a pattern or a feature is detected. The decoupled neurons operate independently, and activate whenever the input matches features learned by particular neurons. The G1, G2, G3 "common" feature neurons shown in the bottom inset plot activate simultaneously.

A neuronal module (such as shown at 220 and 230 in FIG. 2 for example) may be a structure comprising multiple neurons that are all connected to an arbitration mechanism (e.g. arbitration mechanism 250 in FIG. 2) in such manner that they are activated together within a module. A neuronal module, a neuron, and an arbitration mechanism may all be considered neuromorphic hardware that can be implemented in CMOS hardware and/or using memristive components.

A neuron may be implemented, for example, using phase-change devices for synapses and neuronal membrane. For example, in FIG. 1 physical phase-change-based synapses and simulated integrate-and-fire neurons are depicted.

An arbitration mechanism may be implemented using level-tuned neurons, thus the arbitration mechanism may be an additional neuron. Its output tPSPj value, based on the magnitude, sends a "high" value to a particular neuronal module.

A neuronal module is controlled by an arbitration mechanism (as shown in FIG. 2 for example via the black connection between 250 and 220 and 250 and 230). A neuronal module may be enabled when a "high" value is received from the arbitration mechanism, or may be disabled when a "low" value is received. This means that all neurons within a particular module will integrate their tPSPs into Vjs or not. A neuronal module may be physically implemented using, e.g., a transistor on the output of tPSPj in FIG. 1, controlled by the aforementioned signal from the arbitration mechanism.

The present invention, in an embodiment, relates to a neuromorphic architecture for unsupervised feature learning that comprises synapses realized using phase-change devices. The present invention, in an aspect, further relates to a learning rule for the extraction of certain features of the input that is compatible with spiking neurons and synapses with spike-timing-based plasticity.

In an embodiment, an apparatus for computation comprises a first neuronal module comprising a first plurality of neurons, where each neuron in the first plurality of neurons operates with a different learning mechanism selected from a first set of learning mechanisms, a second neuronal module comprising a second plurality of neurons, where each neuron in the second plurality of neurons operates with a different learning mechanism selected from a second set of learning mechanisms, and an arbitration mechanism operatively connected to the first neuronal module and the second neuronal module. In optional embodiments, the first set of learning mechanisms is the same as the second set of learning mechanisms, a learning mechanism in the first set of learning mechanisms comprises spike-timing dependent plasticity with selective potentiation, the first set of learning mechanisms is different from the second set of learning mechanisms, a learning mechanism in the first set of learning mechanisms comprises spike-timing dependent plasticity with selective depression, a learning mechanism in the first predefined set of learning mechanisms comprises inverted spike-timing dependent plasticity, or the arbitration mechanism disables either the first neuronal module or the second neuronal module. In a permissive embodiment, the first plurality of neurons comprises at least a first level tuned neuron, the second plurality of neurons comprises at least a second level tuned neuron, and the arbitration mechanism comprises a third neuron that provides a level output signal that modifies the behavior of the level tuned neurons in the first plurality of neurons and the second plurality of neurons. In another permissive embodiment, the first neuronal module comprises at least a first neuron with inhibitory link, the second neuronal module comprises at least a second neuron with inhibitory link, and the arbitration mechanism comprises an inhibitory output that modifies the behavior of the first neuron and the second neuron. In a further optional embodiment, a spike-timing dependent plasticity comprises an enhancement selected from the group consisting of selective potentiation, selective depression, and inverted spike-timing dependent plasticity, and where the enhancement is controlled by a measure indicative of a learning status. In a further optional embodiment, the measure comprises a cumulative strength of the activated synapses, a count of synapses of the neuron that have high weight values, or the firing of at least one neuron in the first plurality of neurons.

In further embodiments, a method for pattern detection and feature learning comprises training a first neuronal module, where the first neuronal module comprises a first neuron having a first learning mechanism, training a second neuronal module, where the second neuronal module comprises a second neuron having a second learning mechanism, providing an arbitration mechanism connected to the first neuronal module and the second neuronal module, and applying an input to the first neuronal module and the second neuronal module.

In an alternative embodiment, an apparatus for computation comprises a first neuronal module comprising a first level tuned neuron, where the first level tuned neuron has a first learning mechanism, a second neuronal module comprising a second level tuned neuron, where the second level tuned neuron has a second learning mechanism, and an arbitration mechanism operatively connected to the first neuronal module and the second neuronal module and comprising a third neuron that provides a level output that modifies the behavior of the first neuronal module and second neuronal module.

In an embodiment, an apparatus for computation comprises a first neuronal module comprising a first plurality of neurons, a second neuronal module comprising a second plurality of neurons, and an arbitration mechanism operatively connected to the first neuronal module and the second neuronal module. The first neuronal module may comprise at least one neuron, and the arbitration mechanism may modify the behavior of the first neuronal module based on the output of at least one other neuron. The first neuronal module may comprise at least one neuron with an inhibitory link, and the arbitration mechanism may modify the behavior of the first neuronal module based on the output of the at least one neuron with an inhibitory link.

In further embodiments, a neuron within a neuronal module may comprise a different learning mechanism from a second neuron within the same neuronal module. The various neuronal modules may have the same or different learning mechanisms for their constituent neurons. In embodiments, the system can be scaled up by adding modules or separate layers, i.e., incorporating the system into a larger device.

In embodiments, the spike-timing dependent plasticity of a neuron is enhanced by a modification of the learning mechanism that is controlled by a measure indicative of the learning status this neuron. The modifications of the learning mechanism may include selective potentiation, selective depression, inverted STDP, or other types of modifications. The measure may comprise the cumulative strength of the activated synapses (tPSP in FIG. 1), or the measure may alternatively comprise the count of synapses that have high weight values.

Numerous other embodiments are described throughout herein. All of these embodiments are intended to be within the scope of the invention herein disclosed. Although various embodiments are described herein, it is to be understood that not necessarily all objects, advantages, features or concepts need to be achieved in accordance with any particular embodiment. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

The methods and systems disclosed herein may be implemented in any means for achieving various aspects, and may be executed in a form of a machine-readable medium embodying a set of instructions that, when executed by a machine, cause the machine to perform any of the operations disclosed herein. These and other features, aspects, and advantages of the present invention will become readily apparent to those skilled in the art and understood with reference to the following description, appended claims, and accompanying figures, the invention not being limited to any particular disclosed embodiment(s).

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. An apparatus for computation comprising:
  a first neuronal module comprising a first plurality of neurons, wherein each neuron in the first plurality of neurons operates with a different learning mechanism selected from a first set of learning mechanisms;
  a second neuronal module comprising a second plurality of neurons, wherein each neuron in the second plurality of neurons operates with a different learning mechanism selected from a second set of learning mechanisms; and
  an arbitration mechanism operatively connected to the first neuronal module and the second neuronal module;
  wherein the first set of learning mechanisms and the second set of learning mechanisms comprise an application of an inverted learning mechanism following an application of a learning formula comprising spike timing dependent plasticity;
  wherein the spike-timing dependent plasticity comprises an enhancement selected from either selective potentiation or selective depression;

wherein the enhancement is based on a measure indicative of a learning status, the measure comprising a cumulative strength corresponding to, for the first set of learning mechanisms, a first total post-synaptic potential of activated synapses of the first neuronal module, and for the second set of learning mechanisms, a second total post-synaptic potential of activated synapses of the second neuronal module;

wherein at least one first neuron of the first plurality of neurons of the first neuronal module is decoupled from the first neuronal module, wherein the at least one first decoupled neuron operates independently from the other neurons of the first plurality of neurons, and activates in response to an input matching features learned by the at least one first decoupled neuron; and wherein at least one second neuron of the second plurality of neurons of the second neuronal module is decoupled from the second neuronal module, wherein the at least one second decoupled neuron operates independently from the other neurons of the second plurality of neurons, and activates in response to an input matching features learned by the at least one second decoupled neuron.

2. The apparatus of claim 1, wherein the first set of learning mechanisms is the same as the second set of learning mechanisms.

3. The apparatus of claim 1, wherein the first set of learning mechanisms is different from the second set of learning mechanisms.

4. The apparatus of claim 1, wherein a learning mechanism in the first set of learning mechanisms comprises spike-timing dependent plasticity with selective potentiation.

5. The apparatus of claim 1, wherein a learning mechanism in the first set of learning mechanisms comprises spike-timing dependent plasticity with selective depression.

6. The apparatus of claim 1, wherein a learning mechanism in the first predefined set of learning mechanisms comprises inverted spike-timing dependent plasticity.

7. The apparatus of claim 1, wherein the arbitration mechanism disables either the first neuronal module or the second neuronal module.

8. The apparatus of claim 1, wherein the first plurality of neurons comprises at least a first level tuned neuron, the second plurality of neurons comprises at least a second level tuned neuron, and the arbitration mechanism comprises a third neuron that provides a level output signal that modifies the behavior of the first level tuned neuron and the second level tuned neuron.

9. The apparatus of claim 1, wherein the first neuronal module comprises at least a first neuron with inhibitory link, the second neuronal module comprises at least a second neuron with inhibitory link, and the arbitration mechanism comprises an inhibitory output that modifies the behavior of the first neuron and the second neuron.

10. The apparatus of claim 1, wherein the measure comprises a count of synapses of the neuron that have high weight values.

11. The apparatus of claim 1, wherein the measure comprises the firing of at least one neuron in the first plurality of neurons.

12. The apparatus of claim 1, wherein the total post-synaptic potential of a neuron j is calculated as $tPSP_j = \sum_{i=1}^{m} w_{ij} x_i$, wherein $x_i$ is an input spike and $w_{ij}$ are synaptic weights of the neuron j.

13. The method of claim 12, wherein:
the first total post-synaptic potential of activated synapses of neurons of the first neuronal module and the second total post-synaptic potential of activated synapses of neurons of the second neuronal module are each separately integrated into a neuronal membrane potential; and in response to the membrane potential crossing a threshold, a post-synaptic spike is emitted and the membrane potential is reset to zero.

14. A method for pattern detection and feature learning comprising:
training a first neuronal module, wherein the first neuronal module comprises a first neuron having a first learning mechanism;

training a second neuronal module, wherein the second neuronal module comprises a second neuron having a second learning mechanism;

providing an arbitration mechanism connected to the first neuronal module and the second neuronal module;

applying an input to the first neuronal module and the second neuronal module;

wherein the first learning mechanism and the second learning mechanism comprise an application of an inverted learning mechanism following an application of a learning formula comprising spike timing dependent plasticity;

wherein the spike-timing dependent plasticity comprises an enhancement selected from either selective potentiation or selective depression;

wherein the enhancement is based on a measure indicative of a learning status, the measure comprising a cumulative strength corresponding to, for the first learning mechanism, a first total post-synaptic potential of activated synapses of the first neuronal module, and for the second learning mechanism, a second total post-synaptic potential of activated synapses of the second neuronal module;

decoupling at least one first neuron of a first plurality of neurons of the first neuronal module from the first neuronal module, wherein the at least one first decoupled neuron operates independently from the other neurons of the first plurality of neurons, and activates in response to an input matching features learned by the at least one first decoupled neuron; and decoupling at least one second neuron of a second plurality of neurons of the second neuronal module from the second neuronal module, wherein the at least one second decoupled neuron operates independently from the other neurons of the second plurality of neurons, and activates in response to an input matching features learned by the at least one second decoupled neuron.

15. The method of claim 14, further comprising training a third neuronal module, wherein the third neuronal module comprises a third neuron having a third learning mechanism, and applying the input to the third neuronal module.

16. The method of claim 14, wherein the first learning mechanism comprises spike-timing dependent plasticity with selective potentiation.

17. The method of claim 14, wherein the first learning mechanism comprises spike-timing dependent plasticity with selective depression.

18. The method of claim 14, wherein the first learning mechanism comprises inverted spike-timing dependent plasticity.

19. The method of claim 14, further comprising enhancing a spike-timing dependent plasticity of the first neuron with a selective potentiation that is controlled by a measure indicative of a learning status.

20. An apparatus for computation comprising:
a first neuronal module comprising a first level tuned neuron, wherein the first level tuned neuron has a first learning mechanism;
a second neuronal module comprising a second level tuned neuron, wherein the second level tuned neuron has a second learning mechanism; and
an arbitration mechanism operatively connected to the first neuronal module and the second neuronal module and comprising a third neuron that provides a level output that modifies the behavior of the first neuronal module and second neuronal module;
wherein the first learning mechanism and the second learning mechanism comprise an application of an inverted learning mechanism following an application of a learning formula comprising spike timing dependent plasticity;
wherein the spike-timing dependent plasticity comprises an enhancement selected from either selective potentiation or selective depression;
wherein the enhancement is based on a measure indicative of a learning status, the measure comprising a cumulative strength corresponding to, for the first learning mechanism, a first total post-synaptic potential of activated synapses of the first neuronal module, and for the second learning mechanism, a second total post-synaptic potential of activated synapses of the second neuronal module;
wherein the first level tuned neuron of the first neuronal module is decoupled from the first neuronal module, wherein the first level tuned decoupled neuron operates independently from other neurons of a first plurality of neurons of the first neuronal module, and the first level tuned decoupled neuron activates in response to an input matching features learned by the first level tuned decoupled neuron; and
wherein the second level tuned neuron of the second neuronal module is decoupled from the second neuronal module, wherein the second level tuned decoupled neuron operates independently from other neurons of a second plurality of neurons of the second neuronal module, and the second level tuned decoupled neuron activates in response to an input matching features learned by the second level tuned decoupled neuron.

* * * * *